(12) United States Patent
Waldner et al.

(10) Patent No.: US 8,797,958 B2
(45) Date of Patent: Aug. 5, 2014

(54) METHOD OF WIRELESSLY COMMUNICATING DATA BETWEEN VEHICLES AND CENTRAL FACILITIES

(75) Inventors: Matthew R. Waldner, Grosse Pointe Woods, MI (US); Shawn F. Granda, Novi, MI (US); Mark J. Timm, Novi, MI (US); Bradley R. Bloomer, Monroe, MI (US)

(73) Assignee: General Motors LLC, Detroit, MI (US)

( * ) Notice: Subject to any disclaimer, the term of this patent is extended or adjusted under 35 U.S.C. 154(b) by 237 days.

(21) Appl. No.: 13/333,524

(22) Filed: Dec. 21, 2011

(65) Prior Publication Data

US 2013/0163511 A1    Jun. 27, 2013

(51) Int. Cl.
*H04W 4/00* (2009.01)
*H04W 4/02* (2009.01)
*H04W 48/04* (2009.01)

(52) U.S. Cl.
CPC ............... *H04W 4/005* (2013.01); *H04W 4/02* (2013.01); *H04W 48/04* (2013.01)
USPC .......................................................... 370/328

(58) Field of Classification Search
CPC ........ H04W 4/005; H04W 4/02; H04W 48/04
See application file for complete search history.

(56) References Cited

U.S. PATENT DOCUMENTS

| 2004/0203692 | A1* | 10/2004 | Schwinke et al. | 455/419 |
| 2005/0208936 | A1* | 9/2005 | Sumcad et al. | 455/423 |
| 2008/0146202 | A1* | 6/2008 | Krause | 455/414.1 |
| 2008/0170529 | A1* | 7/2008 | Connors et al. | 370/312 |

\* cited by examiner

*Primary Examiner* — John Blanton
(74) *Attorney, Agent, or Firm* — Anthony Luke Simon; Reising Ethington P.C.

(57) ABSTRACT

A method of wirelessly communicating packetized data between a vehicle and a central facility includes receiving a request at a vehicle telematics unit to transmit packetized data; determining whether the vehicle telematics unit is communicating through a roaming wireless carrier system; and delaying the transmission of packetized data between the vehicle telematics unit and a central facility until the vehicle telematics unit is no longer communicating through the roaming wireless carrier system.

18 Claims, 2 Drawing Sheets

METHOD OF WIRELESSLY COMMUNICATING DATA BETWEEN VEHICLES AND CENTRAL FACILITIES

TECHNICAL FIELD

The present invention relates generally to wireless communications and more particularly to communications between vehicles and central facilities.

BACKGROUND OF THE INVENTION

Telematics devices and at least some amount of vehicle monitoring equipment have become nearly standard on all vehicles manufactured today. The vehicle monitoring equipment can include a variety of sensors as well as processing capabilities that receive output from the sensors. The output can be used to generate vehicle performance metrics that are useful to central facilities for monitoring vehicles. As an example, vehicles can include vehicle sensors that monitor variables such as the number of times the vehicle has been started, the ambient temperature where the vehicle is operating, and length of time the engine has operated. The data for these variables can be passed to an on-board processor for calculating the vehicle performance metrics, such as the remaining life of the vehicle engine oil, to give an example. Using the on-board telematics device, a vehicle can wirelessly send the sensor data and/or vehicle performance metrics to a central facility. There, the central facility can provide a number of services, such as vehicle monitoring, troubleshooting, or updating of software. The wireless exchange of information can improve the overall operation of the vehicle.

Nonetheless, an increased number of vehicles using telematics devices and vehicle monitoring equipment have created some challenges. Vehicles having telematics devices usually are associated with a home wireless carrier system that provides communications service at a known fee scale. But vehicles are inherently mobile and may travel to an area not serviced by its home system. In networks other than the home system (e.g. roaming wireless carrier systems), the cost of communicating can sharply rise. And given a large volume of vehicles communicating wirelessly, even small changes in the costs of carrying out these communications can be significant. Thus, even though communications between vehicles and central facilities are generally desirable there are situations during which it may be preferable to temporarily stop those communications.

SUMMARY OF THE INVENTION

According to an aspect of the invention, there is provided a method of wirelessly communicating packetized data between a vehicle and a central facility. The method includes the steps of receiving a request at a vehicle telematics unit to transmit packetized data; determining whether the vehicle telematics unit is communicating through a roaming wireless carrier system; and delaying the transmission of packetized data between the vehicle telematics unit and a central facility until the vehicle telematics unit is no longer communicating through the roaming wireless carrier system.

According to another aspect of the invention, there is provided a method of wirelessly communicating packetized data between a vehicle and a central facility. The method includes the steps of placing a call from a central facility to a vehicle telematics unit; identifying a system identification number (SID) of a wireless carrier system currently used by the vehicle telematics unit to communicate via the placed call; determining whether the identified SID is classified as a roaming wireless communication system; and delaying the communication of packetized data between the vehicle telematics unit and the central facility when the identified SID is classified as a roaming wireless communication system.

According to yet another aspect of the invention, there is provided a method of wirelessly communicating packetized data between a vehicle and a central facility. The method includes the steps of initiating a call from a central facility to a vehicle telematics unit; identifying the system identification number (SID) of a wireless carrier system currently used by the vehicle telematics unit for communication based on the initiated call; determining that the vehicle telematics unit is presently communicating via a roaming wireless carrier system using the identity of the SID; uploading a trigger to the vehicle telematics unit instructing the vehicle telematics unit to: determine that the vehicle telematics unit is no longer communicating using the roaming wireless carrier system; placing a telephone call from the vehicle telematics unit to the central facility; and communicating packetized data between the vehicle telematics unit and the central facility via the call placed from the vehicle telematics unit.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The method described below determines whether a vehicle telematics unit is communicating through a roaming wireless carrier system. If so, the vehicle telematics unit can be instructed to delay communications with a central facility until the vehicle telematics unit is no longer communicating through the roaming wireless carrier system. Many communications between the vehicle and the central facility can contain data that is of lower priority than other communications. And as a result, the transmission of low priority data can be delayed until a more favorable time and/or place is possible. For example, communications between the central facility and the vehicle can include software updates, updates that maintain the existing software configuration on the vehicle, or data used to reflash vehicle electronics. To carry out these communications, the central facility may exchange a significant amount of packetized data with the vehicle. When communications are carried out over thousands of vehicles, even small increases in the rate charged to transmit packets of data can significantly affect the ultimate cost of communications. When vehicles travel into areas serviced by the roaming wireless carrier system, lower priority communications that may be sent at an increased rate can be ended until the vehicle returns to its home wireless carrier system, which can provide a lower data transmission rate. Thus, determining that vehicles are registered and/or communicating with roaming wireless carrier systems can help the central facility regulate communications with the vehicle. By doing so, the increased cost of communicating via roaming wireless carrier systems can be avoided or at least minimized.

Figure 1:
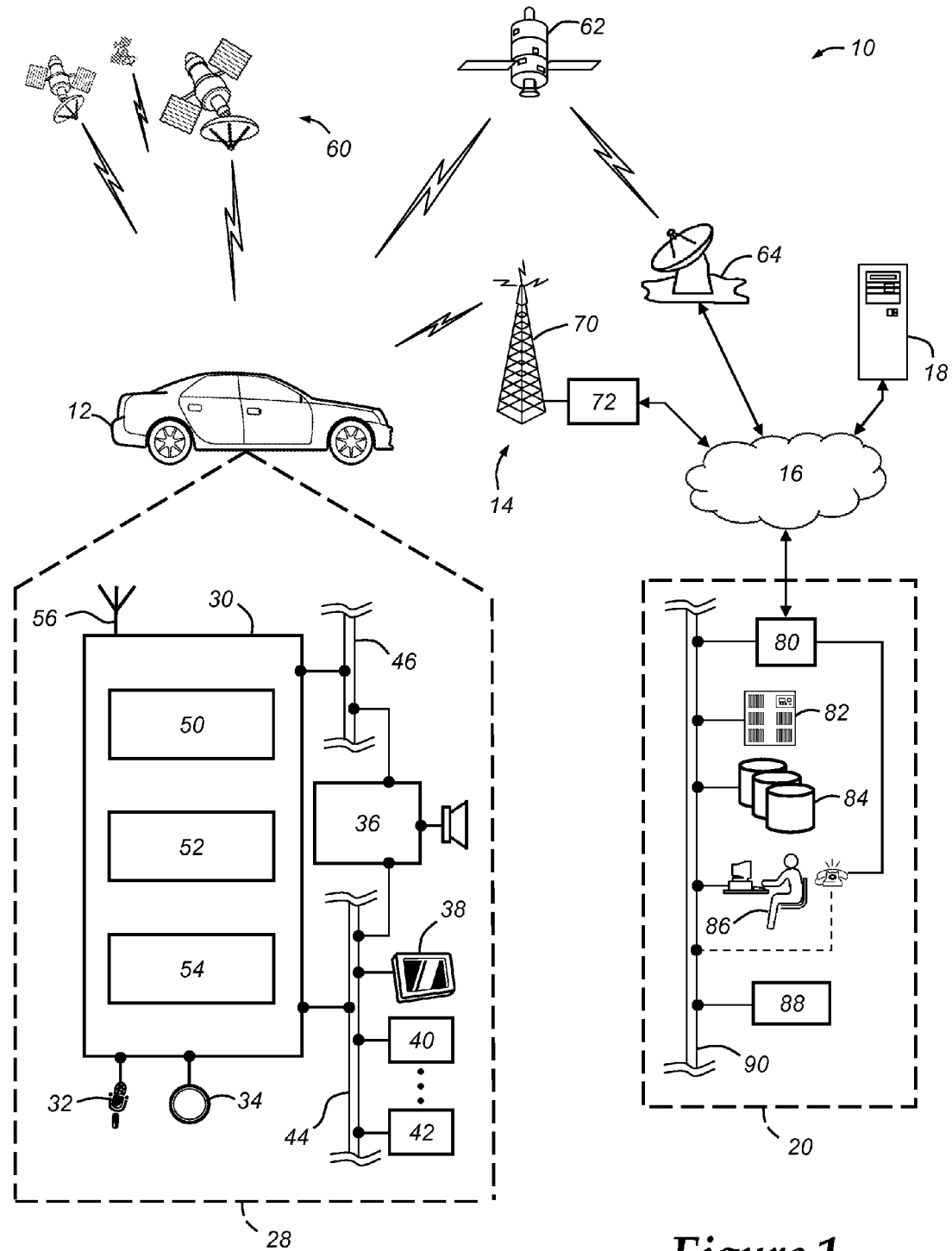
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, EDGE, or LTE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000), GSM/GPRS, or LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements. The wireless carrier system 14 can also be further described as either a home wireless carrier system 14 or a roaming wireless carrier system 14. Home wireless carrier systems 14 can refer to the wireless carrier system 14 that the vehicle telematics unit 30 subscribes to or that has a home location register (HLR) including the identity of the vehicle telematics unit 30. In contrast, the roaming wireless carrier systems 14 can be described as the wireless carrier system 14 that the vehicle telematics unit 30 does not subscribe to or that has a visitor location register (VLR) including the identity of the vehicle telematics unit 30.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
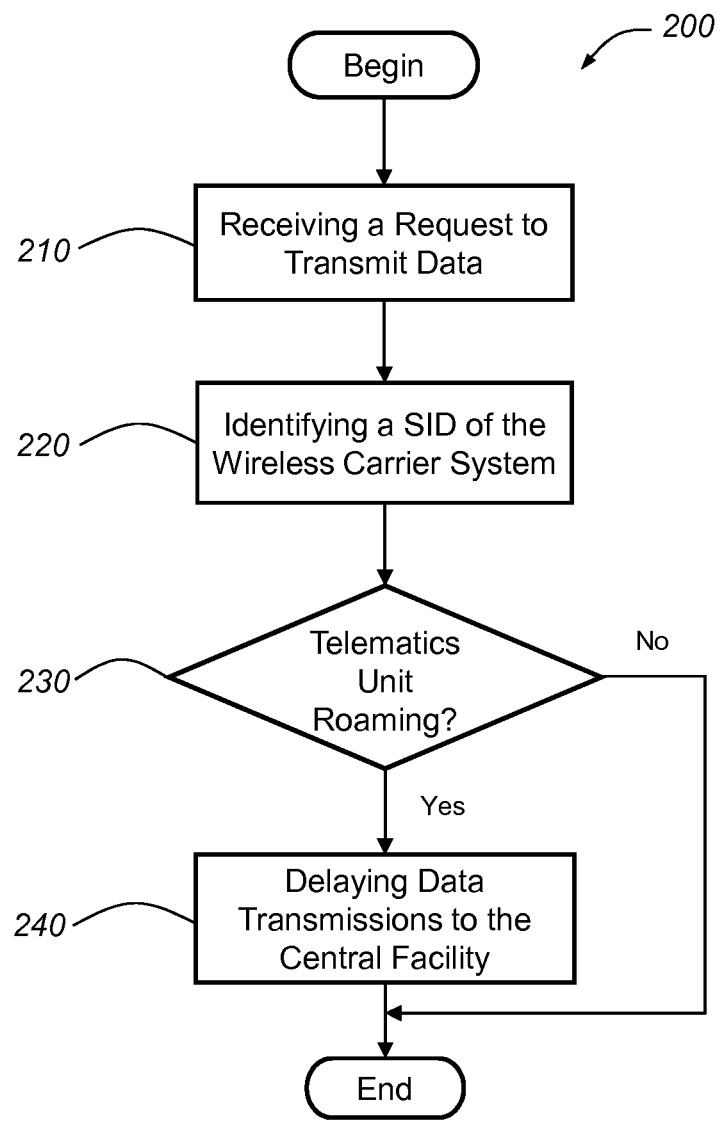
FIG. 2 is a flow chart depicting a method of wirelessly communicating packetized data between a vehicle and a central facility.

Turning now to FIG. 2, there is a method 200 of wirelessly communicating packetized data between the vehicle 12 and a central facility. The method 200 begins at step 210 by receiving a request at the vehicle 12 to transmit packetized data. This request can be a call placed by the central facility, such as call center 20, to the vehicle telematics unit 30. The call can be a circuit-switched call, a packet-switched call, as could be carried out using VOIP, or another method for sending messages to the vehicle telematics unit 30. Using the call described above, the call center 20 can send an instruction in the form of packetized data commanding the vehicle telematics unit 30 to contact the call center 20.

For instance, the vehicle 12 can receive a request to transmit data via a "shoulder tap." The shoulder tap can be a message sent by the call center 20 that contains a computer-readable instruction for the vehicle telematics unit 30 to contact the call center 20. And this can be transmitted in a variety of ways. As one example, the shoulder tap can be constructed as a short message service (SMS) message that is sent to the vehicle telematics unit 30. In another example, the shoulder tap can be packetized data sent via a circuit or packet-switched call from the call center 20. Once the vehicle telematics unit 30 receives the shoulder tap, it can thereafter execute the instruction to transmit data to the call center 20. It is also possible to specify within the request the means used to contact the call center 20. For instance, the request can include an instruction for the vehicle telematics unit 30 to place a circuit-switched call to the call center 20 over the wireless carrier system 14 upon receiving the request. The method 200 proceeds to step 220.

At step 220, a system identification number (SID) is identified for the wireless carrier system 14 currently used by the vehicle telematics unit 30. The SID can be a 15 bit number transmitted by base stations, such as cell tower 70, that identifies the wireless carrier system 14. Generally, the vehicle telematics unit 30 can recognize the SID as belonging to the home or roaming wireless carrier system 14. The vehicle telematics unit 30 can be programmed with the SID of its home wireless carrier system 14. When the vehicle telematics unit 30 powers up or moves from one base station to another, the unit 30 can detect one or more SID(s) and compare the detected SID(s) with the SID of the home wireless carrier system 14 programmed in the vehicle telematics unit 30. If the SIDs match, then the vehicle telematics unit 30 may be using in its home wireless carrier system 14. Otherwise, it may be assumed that the vehicle telematics unit 30 is communicating via a roaming wireless carrier system 14.

The vehicle telematics unit 30 can send the SID of the wireless carrier system 14 it presently uses to the call center 20. In response to the call or shoulder tap received from the call center 20, the vehicle telematics unit 30 can respond by transmitting a detected SID to the call center 20. This can be done in a number of ways. For example, the SID can be transmitted as part of a circuit-switched or packet-switched call between the vehicle telematics unit 30 and the call center 20. Once the call is received at the call center 20, the SID can be determined using the data includes as part of the transmission of the call. In another example, the vehicle telematics unit 30 can detect the SID of the wireless carrier system 14 from the base station through which the unit 30 is presently registered and/or communicating and then encode the detected SID into a message that is sent to the call center 20. The message can have payload that included the SID of the wireless carrier system 14 and can be sent in a variety of forms, such as an SMS message or other message protocol used for wirelessly transmitting data from vehicle telematics units 30. The method 200 proceeds to step 230.

At step 230, it is determined whether the vehicle telematics unit 30 is presently communicating via a roaming wireless carrier system 14. Once the call center 20 has received the SID from the vehicle telematics unit 30, the call center 20 can use the SID to identify the wireless carrier system 14. The call center 20 can determine whether the SID identifies a home wireless carrier system 14 or a roaming wireless carrier system 14 in various ways. For example, the call center 20 can determine whether the SID of the wireless carrier system 14 the vehicle telematics unit 30 is presently communicating through is the same as the SID of the home wireless carrier system 14. If so, it may be determined that the vehicle telematics unit 30 is using a base station of the home wireless carrier system 14. Otherwise, the call center 20 can determine that the vehicle telematics unit 30 is communicating using a roaming wireless carrier system 14 of the vehicle telematics unit 30. It should also be appreciated that the comparison of the received SID with the SID of the home wireless carrier system 14 can be carried out at the vehicle 12 and the results of that comparison can then be wirelessly transmitted to the call center 20.

In another example, it is possible to receive the SID at the call center 20 and compare the received SID to a searchable database that includes roaming and/or non-roaming wireless carrier systems 14. The wireless carrier systems 14 included in the searchable database can be identified and/or classified by one or more SIDs. And each SID can be identified according to whether or not communications using that wireless carrier system 14 would incur costs beyond those charged by the home wireless carrier system 14 associated with the vehicle telematics unit 30. It is also possible to include data other than whether the SID identifies a roaming/non-roaming wireless carrier system 14, such as data representing the roaming fees each wireless carrier system 14 charges. The call center 20 can then compare the roaming fees of a SID with a predetermined cost threshold to determine if the fees fall below the threshold. If it is ultimately determined that the vehicle telematics unit 30 is not communicating using the roaming wireless carrier system 14 and/or the cost of communication is determined to be below the threshold, a packet data communication session between the vehicle telematics unit 30 and the call center 20 can commence or resume and the method 200 then ends. Otherwise, the method 200 proceeds to step 240.

At step 240, the transmission of packetized data between the vehicle telematics unit 30 and the call center 20 is delayed until the vehicle telematics unit 30 is no longer communicating through the roaming wireless carrier system 14. This delay can be implemented at the vehicle 12 or the call center 20. In one example, transmission can be delayed at the vehicle 12 by uploading a trigger containing an instruction to the vehicle telematics unit 30. The trigger can be generated by the call center 20 and instruct the vehicle telematics unit 30 to carry out one or more actions. These actions can include monitoring the identity of the wireless carrier system 14 that the vehicle telematics unit 30 communicates through, such as by monitoring the detected SID(s) broadcast by the wireless carrier system 14. The actions can also include using the vehicle telematics unit 30 to determine that the unit 30 is no longer communicating via the roaming wireless carrier system 14 based on the monitored SID(s). It can be determined that the vehicle telematics unit 30 is no longer communicating through the roaming wireless carrier system 14 based on a change in the SID that is broadcast from a base station the unit 30 communicates through or is registered with. Or it is possible the trigger can instruct the vehicle telematics unit 30 to compare detected SIDs with those included in an on-board preferred roaming list (PRL). When a new SID is detected and the vehicle telematics unit 30 locates the new SID in the PRL, the vehicle telematics unit 30 can determine that it is no longer communicating through the roaming wireless carrier system 14.

In another example, transmission can be delayed at the call center 20 by uploading a trigger containing an instruction to the vehicle telematics unit 30. The trigger can include an instruction for the vehicle telematics unit 30 to alert the call center 20 when the unit 30 detects a new SID. In that case, the trigger can direct the vehicle telematics unit 30 to wirelessly send the newly-detected SID to the call center 20 in one of the ways discussed above. When the call center 20 receives the newly-detected SID, the call center 20 can determine if the newly-detected SID identifies the home wireless carrier system 14. If so, the call center 20 can determine that the newly-detected SID does not identify a roaming wireless carrier system 14 and packetized data can once again be communicated between the vehicle 12 and the call center 20. It should be appreciated that the newly-detected SID that is received at the call center 20 can be analyzed in any one of a variety of ways to determine if the SID identifies home or roaming wireless carrier systems 14. When the vehicle telematics unit 30 is no longer communicating via the roaming wireless carrier system 14, the unit 30 can be instructed by the trigger to alert the call center 20 that a packet data communications session is now possible and that previously-delayed data transmissions can now be resumed.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of wirelessly communicating packetized data between a vehicle and a central facility, comprising the steps of:
   (a) receiving a request at a vehicle telematics unit from the central facility to transmit packetized data;
   (b) determining whether the vehicle telematics unit is communicating through a roaming wireless carrier system in response to the request from the central facility; and
   (c) delaying the transmission of packetized data from the vehicle telematics unit to the central facility in response to the request until the vehicle telematics unit is no longer communicating through the roaming wireless carrier system.

2. The method of claim 1 further comprising the step of receiving a system identification number (SID) at the central facility, wherein the SID identifies a wireless carrier system presently used by the vehicle telematics unit.

3. The method of claim 2, further comprising the step of comparing the received SID with a SID that identifies a home wireless carrier system.

4. The method of claim 2, further comprising the step of comparing the received SID with one or more SIDs included in a preferred roaming list (PRL).

5. The method of claim 2, further comprising the step of comparing the received SID with a searchable database containing a plurality of SIDs each of which identifies a roaming wireless carrier system.

6. The method of claim 1, further comprising the step of transmitting a trigger to the vehicle telematics unit when it is determined that the vehicle telematics unit is communicating through the roaming wireless carrier system.

7. The method of claim 1, further comprising the step of transmitting a trigger to the vehicle telematics unit when it is determined that the vehicle telematics unit is communicating through the roaming wireless carrier system, wherein the trigger instructs the vehicle telematics unit to transmit a message to the central facility each time the vehicle telematics unit detects a system identification number (SID) change.

8. The method of claim 1, further comprising the step of determining that the vehicle telematics unit is no longer communicating through the roaming wireless carrier system by detecting a system identification number (SID) change at the vehicle telematics unit.

9. A method of wirelessly communicating packetized data between a vehicle and a central facility, comprising the steps of:
(a) placing a call from a central facility to a vehicle telematics unit;
(b) identifying a system identification number (SID) of a wireless carrier system currently used by the vehicle telematics unit to communicate via the placed call;
(c) determining at the central facility whether the identified SID is classified as a roaming wireless communication system; and
(d) delaying the communication of packetized data between the vehicle telematics unit and the central facility based on the determination made at the central facility when the identified SID is classified as a roaming wireless communication system.

10. The method of claim 9, further comprising the step of comparing the identified SID with one or more SIDs included in a preferred roaming list (PRL).

11. The method of claim 9, further comprising the step of comparing the identified SID with a searchable database containing a plurality of SIDs each of which identifies a roaming wireless carrier system.

12. The method of claim 9, further comprising the step of transmitting a trigger to the vehicle telematics unit when it is determined that the identified SID is classified as a roaming wireless carrier system.

13. The method of claim 9, further comprising the step of transmitting a trigger to the vehicle telematics unit when it is determined that the vehicle telematics unit is communicating through the roaming wireless carrier system, wherein the trigger instructs the vehicle telematics unit to transmit a message to the central facility each time the vehicle telematics unit detects a SID change.

14. The method of claim 9, further comprising the step of determining that the vehicle telematics unit is no longer communicating through the roaming wireless carrier system by detecting a system identification number (SID) change at the vehicle telematics unit.

15. A method of wirelessly communicating packetized data between a vehicle and a central facility, comprising the steps of:
(a) initiating a call from a central facility to a vehicle telematics unit;
(b) identifying the system identification number (SID) of a wireless carrier system currently used by the vehicle telematics unit for communication based on the initiated call;
(c) determining that the vehicle telematics unit is presently communicating via a roaming wireless carrier system using the identity of the SID;
(d) uploading a trigger to the vehicle telematics unit based on step (c) instructing the vehicle telematics unit to:
(d1) determine that the vehicle telematics unit is no longer communicating using the roaming wireless carrier system;
(d2) placing a telephone call from the vehicle telematics unit to the central facility based on step (d1); and
(d3) communicating packetized data between the vehicle telematics unit and the central facility via the call placed from the vehicle telematics unit, wherein the trigger includes a command to send a message to the central facility each time the vehicle telematics unit detects a SID change.

16. The method of claim 15, further comprising the step of transmitting the identified SID to the central facility and identifying the SID at the central facility.

17. The method of claim 15, further comprising the step of comparing the identified SID with a searchable database located at the central facility that containing a plurality of SIDs each of which identifies a roaming wireless carrier system.

18. The method of claim 15, further comprising the step of determining that the vehicle telematics unit is no longer communicating through the roaming wireless carrier system by detecting a system identification number (SID) change at the vehicle telematics unit.

* * * * *